United States Patent [19]
Daly et al.

[11] Patent Number: 5,021,392
[45] Date of Patent: Jun. 4, 1991

[54] HIGH POROSITY TITANIA-ZIRCONIA CATALYST SUPPORT PREPARED BY A PROCESS

[75] Inventors: Francis P. Daly, Monroe; Hiei Ando, Stamford, both of Conn.; Henry C. Foley, Newark, Del.; Hyun J. Jung, Wayne, Pa.

[73] Assignee: American Cyanamid Company, Stamford, Conn.

[21] Appl. No.: 527,410

[22] Filed: Jun. 14, 1990

Related U.S. Application Data

[62] Division of Ser. No. 98,635, Sep. 18, 1987.

[51] Int. Cl.$^5$ .............................................. A01J 32/00
[52] U.S. Cl. ................................................... 502/439
[58] Field of Search ....................... 502/309, 211, 439

[56] References Cited

U.S. PATENT DOCUMENTS 4,128,505 12/1978 Mikovsky et al. ................... 502/309
4,422,960 12/1983 Shiroto et al. ....................... 502/206

Primary Examiner—W. J. Shine
Assistant Examiner—Douglas J. McGinty
Attorney, Agent, or Firm—William H. Calnan

[57] ABSTRACT

This invention relates to catalyst supports, methods for making them, and to catalysts prepared therefrom. More particularly, it relates to binary oxidic catalyst support materials comprising titania and zirconia with high porosity and high surface area prepared by either a pH swing technique or a constant pH technique followed by calcination at a temperature below 450° C., with such materials being impregnated with catalytically active metal components.

6 Claims, No Drawings

HIGH POROSITY TITANIA-ZIRCONIA CATALYST SUPPORT PREPARED BY A PROCESS

This is a divisional of co-pending application Ser. No. 07/098,635, filed on Sept. 18, 1987.

This invention relates to catalysts supports, methods for making them and to catalysts prepared therefrom. More particularly, it relates to a titania-zirconia catalyst support material with high porosity and high surface area prepared by a pH swing or control pH technique followed by calcination, and to such materials impregnated with catalytically active metal components.

BACKGROUND OF THE INVENTION

It is well known that many petroleum stocks contain sulfur and nitrogen. It is desirable for many applications of the petroleum stock itself or of the products made from it that these be removed. This is an operation requiring a catalyst, and one in common use is an alumina base containing cobaltia and molybdena.

From Shiroto et al., U.S. Pat. No. 4,422,960, it is known that catalysts for hydrotreatment of heavy hydrocarbon oils can be efficiently prepared by co-precipitating oxides of Groups II, III and IV of the Periodic Table in the form of hydrosols. It is further known that such hydrosols can be increased in size to form hydrogels by alternating increasing then decreasing the pH, with base and then with acid, and it is reported to be beneficial to repeat this so-called "pH swing" from 2 to 50 times. The larger hydrogels are then dried and calcined, e.g., at 300° C. maximum to produce catalyst supports. Such supports are then converted into catalysts by impregnation with a minor proportion of a catalytic metal or compound, such as from Groups IVB, VIB, VIII AND IB of the Periodic Table, illustratively, copper, chromium, cobalt, nickel, molybdenum, mixtures of any of them, and the like. The disclosed process of the Shiroto patent has several drawbacks, the primary ones being that the porosity of the catalyst supports is not as high as would appear to be optimum and, especially when salts are used to form the hydrogel, there is a tendency to carry through anionic impurities which can later react with hydrogen to form corrosive substances.

Mikovsky et al., U.S. Pat. Nos. 4,128,505 and 4,186,080, describe titania and zirconia catalyst supports made by coprecipitating, without pH control, the corresponding metal salts, impregnating them with catalytic metals and using them to hydrotreat oils. Because calcining is done in dry air at 1000° F. (538° C.), the Mikovsky process has the drawbacks of producing less than optimum surface area, low pore diameter, and also contamination by anions.

Wakabayashi et al., U.S. Pat. No. 4,248,852, makes an alumina catalyst by precipitating an aluminum hydroxide hydrogel and making it larger and more porous by the pH swing technique. The material is then dried and calcined. Such material will contain anionic impurities and will have less than optimum pore size or surface area, or both.

Other prior art does not appear to disclose catalysts or catalyst supports made exclusively from titania-zirconia or titania-zirconia-alumina, or the use of such supports containing cobaltia and molybdena or other metal oxides or sulfides in hydrotreating reactions. U.S. Pat. No. 3,159,588 does disclose a catalyst containing various combinations of titania and zirconia, but it is essential to the composition that silica be present therein. There is no disclosure in U.S. Pat. No. 3,159,588 of the presence of molybdena or cobaltia. U.S. Pat. No. 2,597,889, U.S. Pat. No. 3,137,658 and U.S. Pat. No. 3,887,494 teach compositions of silica-titania, some containing other metals, in hydrocarbon conversion reactions. U.S. Pat. No. 3,264,227 teaches the manufacture of a silica-zirconia-alumina catalyst useful in hydrocarbon conversion reactions.

U.S. Pat. No. 3,278,421 is concerned with refractory inorganic oxides comprising alumina, titania and zirconia, among others which may contain certain metallic components. There is, however, no disclosure of the particular catalyst of the present invention.

U.S. Pat. No. 3,546,103 teaches hydrodesulfurization with a catalyst of cobalt and molybdenum on an alumina base. It has now been discovered that when binary oxidic catalytic support materials are prepared by a pH swing or control pH technique, followed by calcination within a specific temperature range, a material will result with much higher than expected porosity and surface area with less than readily detectable levels of anions. Such products are of substantial utility as catalyst supports, and with impregnation by metal compounds, as catalysts and absorbent materials generally.

SUMMARY OF THE INVENTION

According to the present invention, there are provided catalysts and catalyst support materials having high porosity and high surface area. Specifically, there are provided catalyst compositions consisting essentially of a high density support of co-precipitated titania and zirconia of compacted bulk density of 0.8–1.2 g/cc, a pore volume of 0.4–0.8 cc/g and a specific surface area by nitrogen BET of greater than 250 to about 400 $m^2/g$ having associated therewith from 2–30 percent by weight of molybdenum oxide and 1–10 percent by weight of nickel oxide or cobalt oxide or both nickel oxide and cobalt oxide, alone, or in further combination with 0.68–6.8 percent by weight of phosphorus.

In a further principal aspect the present invention contemplates a binary oxidic catalyst support material having high porosity and high surface area prepared by a process comprising the steps of:

(i) providing a seed hydrosol of at least two members selected from the group consisting of oxides, halides and oxyhalides of titanium and zirconium.

(ii) mixing a first pH controlling agent with said hydrosol to adjust the pH of said hydrosol to a first region and maintaining said hydrosol at said first pH region, while agitating it, at a temperature and for a period of time sufficient to dissolve fine hydrosol particles;

(iii) then mixing a second pH controlling agent with said hydrosol to adjust the pH of said hydrosol to a second region and maintaining said hydrosol at said second pH region, while agitating it, at a temperature and for a period of time sufficient to cause deposition of the dissolved hydrosol on the undissolved hydrosol and repeating (ii) and (iii) more than once so that said seed hydrosol is caused to grow to an aggregate hydrogel; and, thereafter, (iv) calcining the hydrogel at a temperature above 325° C. and below about 450° C. for from about 0.5 to about 24 hours.

The binary oxidic catalyst support material contemplated by the present invention having high porosity and high surface area, can also be prepared by the process comprising the steps of:
  (i) providing a seed hydrosol of at least two members selected from the group consisting of halides, oxyhalides and oxides of titanium and zirconium;
  (ii) adding a pH controlling agent continuously to said hydrosol to maintain the pH of said hydrosol within the range of from about 8 to about 10;
  (iii) maintaining said hydrosol at said pH range, while agitating it, at a temperature and for a period of time sufficient to cause growth to an aggregate hydrogel; and, thereafter,
  (iv) calcining the hydrogel at a temperature above about 325° C. and below about 450° C. for from about 0.5 to about 24 hours.

DETAILED DESCRIPTION OF THE INVENTION

The present invention encompasses three aspects: First, a binary oxidic catalyst support material having high porosity, high surface area, and low extractable anion content; second, a catalyst comprising a binary oxidic catalyst support with the above characteristics; third, the process for the production of such a binary oxidic catalyst support by a pH swing or control pH technique, hydrothermal treatment, and calcination.

The catalyst support material of this invention comprises two or more inorganic oxides of at least one element selected from among the elements belonging to Groups II, III, and IV of the Periodic Table. The preferred oxides of the present invention are titania and zirconia which are used alone, or as a mixture of two or more thereof.

One or more catalytic metal components can be composited with the inorganic binary oxide carrier. The metal of the catalytic metal components can be selected from among the metals belonging to Groups VB, VIB, VIII and IB of the Periodic Table. The preferred metal components are cobalt, molybdenum, and nickel, mixtures of any of them, and the like. These catalytic metal components can be effectively used, whether in the form of a metal, metal oxide or metal sulfide, or alternatively, they may be partially combined with the carrier material by ion exchange or otherwise. A catalyst incorporating the catalyst support materials of the present invention has associated therewith from 2-30 percent by weight of molybdenum oxide and 1-10 percent by weight of nickel oxide or cobalt oxide or both nickel oxide and cobalt oxide, alone or in further combination with 0.68-6.8 percent by weight of phosphorus.

These catalytic metal components dictate the activity of the catalyst for various reactions such as those involved in the hydrotreatment of a heavy hydrocarbon oil, such as the decomposition and conversion of asphaltenes into lower molecular compounds, and removal of metals, sulfur and nitrogen from asphaltenes. The selection and combination of metals may be made as desired to suit the reaction on which stress is particularly placed on a case to case basis. For vanadium, molybdenum and copper, use is in combination with at least one of cobalt, nickel, tungsten and chromium, for a catalyst which is primarily intended for the decomposition of asphaltenes and removal of metals therefrom. If it is desired to promote the activity of the catalyst for removal of sulfur and nitrogen, as well as for those reactions, it is recommended to use a combination of, for example, cobalt and molybdenum; nickel, cobalt and molybdenum; vanadium, cobalt and molybdenum; or vanadium, nickel, cobalt and molybdenum. In the event only the decomposition of asphaltenes and removal of metals therefrom are of interest, it may be sufficient to use one or both of vanadium and molybdenum in the quantity of about 0.1% to about 10% weight in terms of oxide based on the total weight of the catalyst.

The hydrosol forming substance is an element selected from titanium and zirconium or a compound thereof. Specific examples of the preferred hydrosol forming substances involving titanium and zirconium are as follows: orthotitanic acid, $H_4TiO_4$; metatitanic acid, $H_2TiO_3$; titanium oxide, $TiO_2$; titanium chloride, $TiCl_3$ or $TiCl_4$; titanium sulfate, $Ti_2(SO_4)_3$ or $Ti(SO_4)_2$; titanium oxysulfate, $TiOSO_4$; titanium bromide, $TiBr_4$; titanium fluoride, $TiF_3$ or $TiF_4$; and titanic acid ester, $Ti[O.CH(CH_3)_2]_4$. Examples of preferred materials involving zirconium are zirconyl chloride, $ZrOCl_2.8H_2O$; zirconyl hydroxide, $ZrO(OH)_2$; zirconyl sulfate, $ZrO(SO_4)$; sodium zirconyl sulfate, $ZrO(SO_4).Na_2SO_4$; zirconyl carbonate, $ZrO(CO_3)$; ammonium zirconyl carbonate, $(NH_4)_2ZrO(CO_3)_2$; zirconyl nitrate, $ZrO(NO_3)_2$; zirconyl acetate, $ZrO(C_2H_3O_2)_2$; ammonium zirconyl acetate, $(NH_4)_2ZrO(C_2H_3O_2)_3$; zirconyl phosphate, $ZrO(HPO_4)_2$; zirconium tetrachloride, $ZrCl_4$; zirconium silicate, $ZrSiO_4$; and zirconium oxide, $ZrO_2$.

The preparation of binary oxidic catalyst support materials according to this invention will now be described in further detail.

(1) Formation of a Seed Hydrosol

According to this invention, a seed hydrosol formed from hydroxides of the elements titanium and zirconium is first established. The seed hydrosol can be prepared by any known method, such as by heterogeneous precipitation, homogeneous precipitation, coprecipitation, ion exchange, hydrolysis and metal dissolution using as starting material at least one of the above-mentioned hydrosol forming substances.

Heterogeneous precipitation is a method in which an alkaline or acidic solution of at least two hydrosol forming substances is neutralized with a solution containing an acid or alkaline salt. For example, ammonia, sodium hydroxide, or the like is added as a neutralizing agent into a solution of hydrosol forming substances in the form of a nitrate or sulfate, while it is being stirred; or a solution of a hydrosol forming substances in the form of an alkali metal salt or an ammonium salt is neutralized with hydrochloric or sulfuric acid, and converted to a hydroxide. A specific example of such heterogeneous precipitation comprises adding ammonia or sodium hydroxide into a solution containing zirconium nitrate and titanium sulfate as a neutralizing agent, while it is being stirred, thereby forming a seed hydrosol of zirconia and titania.

Homogeneous precipitation is basically the same as heterogeneous precipitation, but is distinguished from it by maintaining the concentration of the neutralizing agent uniform throughout neutralization to ensure uniform precipitation. For example, homogeneous precipitation from a solution containing at least two hydrosol forming substances in the form of acid salts employs an ammonia releasing substance, e.g., urea or hexamethylenetetramine, as a neutralizing agent. A specific example of homogeneous precipitation comprises dissolving a necessary quantity of urea in a zirconium nitrate and titanium chloride solution, heating the resulting mixed solution gradually while stirring it, whereby decomposing the neutralizing agent gradually to cause it to release ammonia, and neutralizing the metal salts with the released ammonia gradually to convert them to a seed zirconia-titania hydrosol.

Coprecipitation is a method for preparing a hydrosol by neutralizing simultaneously at least two acidic or alkaline hydrosol forming substances together, or neutralizing a mixture of at least one acidic hydrosol forming substance and at least one alkaline hydrosol forming substance. A specific example of this method comprises adding sodium hydroxide as a neutralizing agent into a mixed solution containing both zirconium nitrate and titanium nitrate, while stirring it, thereby forming a coprecipitated seed hydrosol of zirconia and titania; or adding a zirconium nitrate solution into a sodium titanate solution for neutralization, while stirring it, whereby a coprecipitated seed hydrosol of zirconia-titania is formed.

The method involving hydrolysis forms a hydrosol by adding water into at least two hydrolyzable hydrosol forming substances to effect its hydrolysis. A specific example of this method comprises adding an alcoholic solution of titanium tetrachloride and zirconium isopropoxide gradually into water, while stirring it, to effect its hydrolysis, whereby a seed titania-zirconia hydrosol is formed.

As described above, various methods are known for preparing seed hydrosols, and modifying them. In this connection, it is to be noted that as the preparation of those seed hydrosols is a matter well known to the art, nothing connected therewith imposes any limitation on the method of preparing a catalyst according to this invention. The preparation of the seed hydrosol may be carried out appropriately to suit the type of the hydrosol forming substance to be used as the starting material for the seed hydrosol, and the intended physical properties of the catalyst to be prepared. A commercially available hydrosol may be employed, if appropriate. There is no limitation in particular to the hydrosol concentration, unless it has undergone total gelation to the extent that it cannot be stirred. Usually, however, its concentration is not greater than 10% by weight, particularly about 0.1 to 5.0% by weight.

(2) Growth of Seed Hydrosol to a Hydrogel

The method of preparing a binary oxidic catalyst support material according to this invention is saliently featured by including a step for homogeneous growth of the seed hydrosol, as this step enables the industrial manufacture of such materials having the physical properties intended by this invention.

In one way of carrying out this step, the pH of the seed hydrosol is changed between a dissolution region (or a first pH region) where fine hydrosol particles are dissolved, and a precipitation region (or a second pH region) where the dissolved hydrosol is precipitated, by alternately adding first and second pH controlling agents. At least one of the first and second pH controlling agents includes the aforementioned hydrosol forming substance or substances so that ultimately, the size of the seed hydrosol particles increases uniformly. When the pH of the hydrosol is in the precipitation region, fine hydrosol particles dissolved in the dissolution region and the hydrosol formed from the hydrosol forming substance deposit on the undissolved hydrosol, whereby the hydrated oxide crystallites are allowed to grow. On the other hand, when the pH of the hydrosol in the dissolution region, fine crystallites of the hydrosol are dissolved so that there remains only seed hydrosol having a certain level of sizes.

Such pH variation is effected by using a pH controlling agent. As the pH adjusting agent, it is advantageous to use the hydrosol forming substance per se. If the hydrosol forming substance is an acid substance, it acts as a pH controlling agent for lowering the pH of the hydrosol, while an alkaline hydrosol forming substance can be used to raise it. If the hydrosol forming substance is neutral, or if the hydrosol forming substance alone is not sufficient to provide a satisfactory pH control for the hydrosol, another suitable acidic or alkaline material may be used for the pH control. If an acidic material is required, both organic and inorganic acids can be used, and include, for example, nitric acid ($HNO_3$), hydrochloric acid (HCl), sulfuric acid ($H_2SO_4$), carbonic acid ($H_2CO_3$), formic acid (HCOOH), and acetic acid ($CH_3COOH$). Examples of suitable alkaline substances include ammonia ($NH_3$), sodium hydroxide (NaOH), potassium hydroxide (KOH), sodium carbonate ($Na_2CO_3$, $Na_2CO_3.H_2O$, $Na_2CO_3.7H_2O$ or $Na_2CO_3.10H_2O$), potassium carbonate ($K_2CO_3$ or $K_2CO_3.1.5H_2O$), sodium hydrogencarbonate ($NaHCO_3$), potassium hydrogencarbonate ($K_2HCO_3$), potassium sodium hydrogencarbonate ($KNaCO_3.6H_2O$) sodium aluminate ($NaAlO_2$). Thus, when, for example, the dissolution and precipitation regions are acidic and alkaline pH regions, respectively, an acidic hydrosol forming substance alone, an acidic material alone or a combination of a neutral or acidic hydrosol forming substance and an acidic material can be used as the first pH controlling agent for adjusting the pH of the hydrosol to the dissolution region, while an alkaline hydrogel forming substance alone, an alkaline material alone or a combination of a neutral or alkaline hydrosol forming substance and an alkaline material may be employed as the second pH controlling agent for adjusting the pH of the hydrosol to the precipitation region. A suitable combination may be selected in accordance with the solution intended. When the pH controlling agent is a combination of a hydrosol forming substance and an acidic or alkaline material, the hydrosol forming substance may be added before, simultaneously with, or after the addition of the acidic or alkaline material.

One preferred method of this invention includes a cycle of the sequential steps of changing the pH of the hydrosol from the precipitation region to the dissolution region and bringing it back to the precipitation region to effect the crystal growth of the seed hydrosol to a coarse mass of hydrogel particles having an ultimately uniform size. According to this aspect of the invention, the porous structure of the catalyst support material to be prepared depends on how often such cyclic pH variation is repeated. The number of times of the cycle of the sequential steps may be only once, but is usually from twice to fifty times. The quantity of the hydrosol forming substance added every time is so controlled as to ensure maintenance of an uniformly agitated condition in the reaction vessel, so that a uniform hydrosol particle dispersion may be established. If the concentration of the hydrosol particles is too high, it is difficult to stir the hydrosol uniformly, resulting undesirably in the occurrence of differences in the hydrosol concentration from one place to another, which may prevent the uniform growth of the hydrosol particles. The quantity of the hydrosol forming substance added every time may generally be expressed by way of the quantity of an oxide thereof, and ranges from 2 to 200 molar percent of the total amount, in terms of oxide, of the seed hydrosol and the hydrosol forming substance which has been added to the seed hydrosol, i.e., the total amount of the hydrosol present at each time of addition of the hydrosol forming substance. The total quantity of the hydrosol forming substance added throughout this hydrosol growing stage is so determined that the hydrosol to be ultimately formed may contain about 1 to 10% by weight of hydrosol particles in terms of the weight of an oxide thereof. The quantity of the hydrosol forming substance to be added in each pH variation is preferably the same, but may be variable in the range of 75 to 400 percent by weight relative to the average quantity through all the variation steps. The hydrosol forming substance is added into the hydrosol in a form which is easily soluble therein, for example, in the form of fine powder or a solution. In the event the hydrosol forming substance is added in the form of an aqueous solution thereof, it has a concentration of 0.05 to 5 percent by weight preferably 0.1 to 3 percent by weight, in terms of the weight of an oxide thereof.

The reaction for the growth of the seed hydrosol particles is caused to take place with agitation. This agitation is conducted to ensure that the concentration of the hydrosol particles in the reaction vessel may have as uniform a distribution as possible in order to achieve the uniform growth of the hydrosol particles and to prevent fine hydrosol particles from staying in the hydrosol without being absorbed by larger particles. In order to attain these objects successfully, it is preferable to carry out the agitation as quickly as possible. The hydrosol is maintained in the dissolution region for a sufficient time to ensure that new fine hydrosol particles formed by each addition of the hydrosol forming substance be completely dissolved to form a hydrosol having a uniform particle size. If the hydrosol is left in the dissolution region for an unnecessarily long time, its particles are dissolved to an unnecessary extent, and their crystal growth is seriously inhibited. The length of this holding time is closely related to the value of pH of the dissolution region and the type of the hydrosol, and is desired to be selected appropriately to suit them. The holding time may usually be in the range of about one to sixty minutes after addition of the first pH controlling agent. It should be shortened with a decrease in the value of pH if the pH of the dissolution region is on the acid side, and with an increase in the pH value if the dissolution region is on the alkaline side. For example, a hydrosol of titania-zirconia has a pH range of 1 to 2, and the holding time therefor may approximately be from one to thirty minutes. A catalyst prepared from a hydrosol having an uneven particle size is inappropriate for the hydrotreatment of a heavy hydrocarbon oil, since it has its specific surface area reduced by sintering of fine particles during its calcination and is formed with many fine pores. If the hydrosol is held appropriately in the dissolution region, its particles are made uniform in size.

The hydrosol may be held in the precipitation region after addition of the second pH controlling agent for a period of time sufficient to ensure that the hydrosol formed from the hydrosol forming substance and the dissolved fine hydrosol particles be occluded by the seed hydrosol particles unified in size during the dissolution region to cause new crystal growth of the hydrosol particles, and that the growth of those crystal particles be stabilized. This holding time is usually longer than that for the dissolution region, and may approximately range from one minute to ten hours. For titania-zirconia, the holding time may approximately be from one minute to two hours with a pH range of 8 to 10, and for silica-alumina, it may approximately be from one minute to ten hours with a pH range of 6 to 11.

As is obvious from the foregoing, the pH of the hydrosol provides a guideline for the holding thereof in the dissociation or precipitation region, and its magnitude has a very great bearing on the rates of hydrosol dissolution and precipitation. It is a very important factor, since it also sometimes influences the crystal form of hydrosol particles growing while the hydrosol is in the precipitation region.

The pH range differs with the type of the hydrosol forming substance employed, the pH controlling agent, their combination, the proportions of the components in case of a multi-component hydrosol, the type of the particles in a hydrosol slurry, their crystal form and concentration, the slurry temperature, the type of the salt present in the slurry if any, or the like, but generally, the precipitation region has a pH of 8.9, while the remaining acidic or alkaline range represents the dissolution range. For example, the precipitation region for a titania-zirconia hydrosol generally has a pH of 8 to 10, while its dissolution region has a pH value less than 4 or greater than 1. For the purpose of this invention, however, it is desirable to vary the pH value of a titania-zirconia hydrosol between the dissolution region of pH 1.6 or below and the precipitation region of pH 8 to 10.

Instead of the pH swing techniques set forth above, the novel catalyst supports of this invention can be prepared by simultaneous addition of titania-zirconia compounds and neutralizing agent, maintaining constant pH during hydrogel formation (continuous pH method). This increases the rate of growth of the co-crystallites. The same neutralizing agents set forth above can be used, but it is convenient and preferred to use aqueous ammonia, i.e., ammonium hydroxide. As will be seen in the detailed example hereinafter, this technique involves continuously mixing the solution at a moderately elevated temperature, e.g., 35°–50°, preferably 40°–45° C. maintaining pH in a suitable range, e.g., 6.0–10.0, preferably, 8.9–9.8, for a suitable time, e.g., about 1.5 hours. The hydrogel is then stirred for several hours additional, then separated from the aqueous solution, as before, e.g., by filtration. Calcination and other steps including impregnation with catalytically-active compounds, will be the same for supports prepared either by the swing pH method, or by the continuous pH method.

(3) Aging of a Hydrogel

The aging of a hydrogel is optionally carried out and can be considered as the final step of the aforementioned hydrosol growing stage. It comprises holding the grown hydrogel in the hydrosol-precipitation region for a certain length of time, whereby the hydrosol particles are unified in size, and stablized. The effect of the aging can be enhanced by stirring, and aging under heat is particularly desirable, since it is likely to stabilize the crystal form of the hydrosol particles. Aging is generally conducted at a temperature from ambient to 100° C., and if it is performed at a temperature above 100° C., it is carried out under pressure. The aging time is approximately in the range from 0.5 to 24 hours. The hydrogel does not always need to be aged, but may be transferred to the following process without undergoing any aging treatment.

(4) Control of Solids in the Hydrogel

The solids content of the hydrogel is controlled in the range of about 10 to 80 percent by weight, preferably 15 to 65 percent by weight to facilitate its molding. If its solids content is less than about 10% by weight, it is difficult to maintain a shape molded from the hydrogel, while any solids content in excess of about 80 percent by weight requires an extremely high molding pressure, and also results in the formation of a catalyst failing to possess any satisfactory physical property. The adjusting of the solids content of the hydrogel may be carried out by dehydration by drying under heat, spray drying, atmospheric, vacuum or pressure filtration, centrifugal separation, or otherwise until a desired solids content is reached.

(5) Molding of the Hydrogel

The hydrogel, of which the solids content has thus been adjusted is molded into a shape which is suitable for the purpose for which the catalyst support material is intended. The shape may be circular, cylindrical, whether solid or hollow, or noncircular in cross section, e.g., oval, tri-lob or quadri-lob. The hydrogel may also be molded into a granular form. The molding of the hydrogel may be appropriately carried out by extrusion molding with a piston or screw type extruder, or by tablet formation with a press or the like. The formation of the hydrogel into granules may be performed by, for example, oil dropping and wet granulation.

(6) Calcination of Molded Hydrogel Products

The hydrogel product which has been molded into the desired shape and dimensions is preferably not dried, but is calcined wet in the presence of dry air, water or steam. This is done in order to provide optimum porosity. Water or steam also reduces the amount of anionc impurities to very low levels and obviates the need to wash the hydrogel. The calcination is preferably carried out at as high a temperature as practically possible, but appropriate conditions must be selected on a case to case basis, since some types of hydrogel are likely to cause sintering or crystal deformation when calcined. Generally, the hydrogel is calcined at 300° C to 500° C. preferably at 325° C. to 450° C. This process usually requires 0.5 to 24 hours. When the hydrogel has, thus, been heated, or calcined or fired at a high temperature, it is converted to an oxide.

(7) Supporting of Catalytic Metal Component

A catalytic metal component is supported on the dried or calcined product thereof, if no such metal component has been added during the aforementioned hydrogel forming process. For this purpose, any known starting material or method of preparing the same may be employed, only if it is possible to disperse a predetermined quantity of such component uniformly in the catalyst. For example, the starting material can be selected from among various kinds of compounds each containing a single or a plurality of specific elements, and any known method suiting the starting material can be used for preparing the necessary component.

The metal of the catalytic metal component for the catalyst according to this invention is selected from among molybdenum, nickel alone or combined with cobalt, or any of them in further combination with phosphorus. Thus, a catalyst incorporating the catalytic metal component of the present invention has associated therewith molybdenum oxide and nickel oxide or cobalt oxide or both nickel oxide and cobalt oxide, alone, or in further combination with phosphorus.

Examples of the molybdenum compounds for use as the material for the catalytic metal component include oxides such as $MoO_3$ and $MoO_2$, molybdic acid and its salts such as $H_2MoO_4$, $H_2MoO_3H_2O$, $(NH_4)Mo_2O_7$, $(NH_4)_2MoO_4$ and $(NH_4)_6Mo_7O_{24}.4H_2O$, and chlorides such as $MoCl_3$ and $MoCl_4$. Examples of the relevant cobalt compounds include oxides such as $CoO$, $Co_2O_3$, $CoO_2$ and $Co_3O_4$, cobalt salts such as $CoCl_2$, $CoCl_2.6H_2O$, $Co(NO_3)_2.6H_2O$, $CoSO_4.7H_2O$, $Co(CH_3CO_2)_2.4H_2$ and $CoC_2O_4.2H_2O$, cobalt hydroxide $Co(OH)_2$, and cobalt carbonate (basic). Examples of the relevant nickel compounds are nickel oxide, $NiO$; nickel salts such as $NiCl_2$, $NiBr_2NiI_2$ and the hydrates thereof, $Ni(NO_3)_2.6H_2O$, $NiSO_4.6H_2O$, $Ni(CH_3CO_2)_2.4H_2O$ and $NiC_2O_4.2H_2O$; nickel hydroxide, $Ni(OH)_2$; nickel carbonate; and nickel acetylacetonato.

Various methods are available or supporting these catalytic metal components on the carrier prepared as hereinbefore described. For example, predetermined quantities of cobalt and molybdenum are preferably supported on the dried or calcined hydrogel by impregnating the latter with an ammoniacal aqueous solution of cobalt nitrate and ammonium molybdate. It is, however, possible to use any other known method, e.g., mixing, impregnation, kneading, or ion exchange. Alternatively, it is possible, as stated above, to select the aforementioned hydrotreating catalytic metal compound or compounds appropriately as required, and add them as a part of the pH controlling agent during the hydrosol growing stage. Whichever of these methods may be adopted, there is hardly any difference in the performance of the catalyst and catalyst support material to be obtained, if the necessary quantity of the catalytic metal component is supported on, or incorporated into the carrier.

In addition to the above-mentioned catalytic metal component for catalytic hydrotreatment, it is effective to add phosphorus to the catalyst in order to improve its activity for other specific reactions, such as denitrification and reduction of Conradson carbon residue. This auxiliary catalytic elements can be incorporated into, or supported on the catalyst in a quantity of about 0.4 to 8.0 percent by weight in a customary manner. In order to incorporate phosphorus, it is possible to use phosphorus oxide ($P_2O_5$), phosphoric acid or a salt thereof, such as orthophosphoric acid, metaphosphoric acid, pyrophosphoric acid and ammonium phosphate, or the like. The phosphorus compounds may be added with the metal component for hydrotreatment. In other words, it is possible to use a substance containing two or more catalyst forming elements, such as nickel phosphate, cobalt phosphate, phosphomolybdic acid and ammonium phosphomolybdate.

The catalytic metal component thus supported on the carrier is dried, and calcined so that it may be firmly secured to the carrier. It may be dried and calcined under the same conditions with the aforementioned precalcination of the hydrogel. The calcination temperature is appropriately selected to suit the components forming the catalyst, since too high a temperature is likely to cause changes in the physical properties of the carrier material by sintering, and reduction in the activity of the catalyst by chemical reaction between the catalytic metal component and the carrier material. The drying and calcining step is carried out in a temperature range of about 100° C. to about 500° C., preferably 325° C.–450° C., as is the case with the support calcining step.

As described previously, supporting of the catalytic metal component on the carrier material cannot only be effected after drying or calcining the hydrogel, but can also be effected before molding the hydrogel, even during the growth of the hydrosol. For example, the catalytic metal component may be added to the hydrosol in the form of a soluble salt together with a pH controlling agent, or as a part thereof. The hydrogel into which the metal component has been added is molded, formed into xerogel and ultimately calcined, whereby to obtain a catalyst having the catalytic metal component composited with the inorganic oxide carrier. In an alternative, the catalytic metal component may be added into the grown hydrogel and kneaded therewith in order to incorporate the metal component into the hydrogel. The hydrogel into which the metal component has been mixed is molded, formed into a xerogel, and calcined, whereby it is converted to an inorganic oxide in which the metal component is dispersed.

DESCRIPTION OF THE PREFERRED EMBODIMENTS

The following examples illustrate the compositions and articles of this invention. They are not to be construed to limit the claims in any manner.

All parts and percentages are by weight, unless otherwise specified.

EXAMPLE 1

(a) Preparation of $TiO_2$—$ZrO_2$ 3196.0 g $TiCl_4$ was slowly added to ice water. Then 4200.0 g $ZrOCl_2.4H_2O$ was mixed with the $TiCl_4$/ice water to produce a 32 liter solution. This solution was left overnight to stand at room temperature.

Over a period of 1.5 hours, at a temperature of 43°–45° C., and at a pH range of 8.9–9.8 (continuous pH method), the Ti/Zr solution and a 50% $NH_4OH$ solution are slowly pumped into 5 liters of warm deionized water. At three intervals while the solution is being agitated, a total of 16 liters of warm deionized water are slowly added (8, 4, and 4 liters). Also, a total of 10 gallons of the solution are drawn off at two-5 gallons intervals at 45 minutes and again at 1 hour and 5 minutes. The solutions (drawn off and remaining) are slowly filtered with the filtrate cake left to dry overnight. This material was then calcined in dry air at 350° C. for 3 hours.

The physical properties of the $TiO_2$—$ZrO_2$ sample prepared by the procedure of Example 1 are displayed in TABLE 1.

(b) Preparation of $CoO$—$MoO_3$/$TiO_2$—$ZrO_2$ Catalyst 4.7 g of $TiO_2$—$ZrO_2$ was impregnated with 51 cc of ammonium heptamolybdate (31.2 g/100 cc), dried at 100° C. and then impregnated with 45 cc of a solution of $Co(NO_3)_2.6H_2O$ (21.6 g/100 cc) and dried at 100° C. The resulting material was then calcined at 350° C. in a dry air stream for 2 hours.

(c) Hydrodenitrogenation with $CoO$—$MoO_3$/$TiO_2$—$ZrO_2$ Catalyst

A vacuum gas oil was passed over the $CoO$—$MoO_3$/$TiO_2$—$ZrO_2$ catalyst under the conditions described in Table 2, Column 1. A total of 80 cc of catalyst was used. Prior to testing, the catalyst was presulfided at 370° C. for 2 hours in 10 percent by volume $H_2S$ in $H_2$.

The results are presented in Table 3. Hydrodenitrogenation activity test results are reported as relative weight activity (RWA) and relative volume activity (RVA) with American Cyanamid's commercial HDN-30 catalyst (5 wt % NiO-21 wt % $MoO_3$/$Al_2O_3$) assigned RWA and RVA values of 100.

This catalyst according to the invention is highly active and is seen to provide excellent results.

COMPARATIVE EXAMPLE 1A

For comparison purposes, the general procedure of U.S. Pat. Nos. 4,128,505 and 4,186,080 is followed to make a catalyst comprising molybdenum and cobaltia supported on titania-zirconia. A higher calcining temperature is used and the pH is not controlled.

(a) Preparation of $TiO_2$—$ZrO_2$ 75.0 g $TiCl_4$ and 98.8 g $ZrOCl_2$ $4H_2O$ were dissolved in 4 liters of deionized water. This solution was divided into two-2 liters aliquot portions. Each was then stirred vigorously while $NH_4OH$ (50% solution) was added dropwise until the pH increased to 8.5 (increasing pH adjustment). The white precipitates were then filtered off and washed with deionized water to remove chloride ions. This material was then dried at 100° C.

A third batch consisting of 16.23 g $TiCl_4$ and 21.35 g $ZrOCl_2$ $4H_2O$ was dissolved in 875 cc of solution and precipitated and dried as the above material.

The dried materials were mixed together and ground to 14×40 mesh and calcined at 540° C. for 2 hours in a stream of dry air. The physical properties of the $TiO_2$—$ZrO_2$ sample prepared by the procedure of Example 1A are displayed in TABLE 1.

(b) Preparation of $CoO$—$MoO_3$/$TiO_2$—$ZrO_2$ Catalyst 58.33 g of $TiO_2$—$ZrO_2$ was impregnated with 35 cc of ammonium heptamolybdate (20.2 g/100 cc), dried at 100° C. and re-impregnated with 35 cc of ammonium heptamolybdate and dried again at 100° C. The material was then impregnated with 35 cc of a solution of $Co(NO_3)_2.6H_2O$(23.95 g/100 cc) and dried at 100° C. The resulting material was then calcined at 350° C. in an air stream for 1 hour.

(c) Hydrodenitrogenation with $CoO$—$MoO_3$/$TiO_2$—$ZrO_2$ Catalyst

A gas oil was passed over the $CoO$—$MoO_3$/$TiO_2$—$ZrO_2$ catalyst under the conditions described in Table 2, Column 2. A total of 70 g of catalyst was used. Prior to testing, the catalyst was presulfided at 370° C. for 2 hours in 10 percent by volume $H_2S$ in $H_2$.

The results are presented in Table 3. Hydrodenitrogenation activity test results are reported as relative weight activity (RWA) and relative volume activity (RVA) with American Cyanamid's commercial HCH catalyst (2 wt % NiO-2 wt % P-18 wt % $MoO_3$/$Al_2O_3$) assigned RWA and RVA values of 100.

This catalyst according to the prior art is relatively less highly active than that prepared by Example 1. It has lower pore volume and much lower surface area.

COMPARATIVE EXAMPLE 1B

For comparison purposes, a catalyst is prepared following the general procedure of Example 1A using an increasing pH adjustment but lowering the calcination temperature.

(a) Preparation of TiO$_2$—ZrO$_2$ 112.6 g TiCl$_4$ and 148.2 g ZrOCl$_2$.4H$_2$O were dissolved in 6 liters of deionized water. Using 2 liter aliquots of this solution, NH$_4$OH was added with stirring until the pH increased to 8.0-8.5 (increasing pH adjustment). The precipitate formed (white) was filtered off and washed with deionized water to remove chloride ions. The material was then dried at 120° C.

After these steps, only 80 g of the precipitate remained. Preparations using ½ of the above quantities were repeated. After drying, the precipitates were ground to 20×40 mesh prior to mixing, mixed, and then calcined at 350° C. in dry air for 3 hours.

The physical properties of the TiO$_2$—ZrO$_2$ sample prepared by the procedure of Example 1B are displayed in TABLE 1.

(b) Preparation of CoO—MoO$_3$/TiO$_2$—ZrO$_2$ Catalyst 91.0 g of TiO$_2$—ZrO$_2$ was impregnated with 36 cc of ammonium heptamolybdate (30.7 g/100 cc), dried at 100° C. and re-impregnated with 36 cc of ammonium heptamolybdate and dried again at 100° C. The material was then impregnated with 36 cc of a solution of Co(NO$_3$)$_2$.6H$_2$O(36.9 g/100 cc) and dried at 100° C. The resulting material was then calcined at 350° C. in an air stream for 1 hour.

(c) Hydrodenitrogenation With CoO—MoO$_3$/TiO$_2$—ZrO$_2$ Catalyst

A gas oil was passed over the CoO—MoO$_3$/TiO$_2$—ZrO$_2$ catalyst under the conditions described in Table 2, Column 2. A total of 70 g of catalyst was used. Prior to testing, the catalyst was presulfided at 370° C. for 2 hours in 10 percent by volume H$_2$S in H$_2$.

The results are presented in Table 3. Hydrodenitrogenation activity test results are reported as relative weight activity (RWA) and relative volume activity (RVA) with American Cyanamid's commercial HCH catalyst (2 wt % NiO-2 wt % P-18 wt % MoO$_3$/Al$_2$O$_3$) assigned RWA and RVA values of 100.

The catalyst obtained by this procedure is somewhat more active than that obtained by the prior art procedure, but has a low pore volume and does not possess all of the advantages of catalysts prepared in accordance with this invention.

EXAMPLE 2

(a) Preparation of TiO$_2$—ZrO$_2$

A solution of TiCl$_4$ and ZrOCl$_2$.4H$_2$O is coprecipitated with NH$_4$OH at 55°-70° C. by pH swing methodology as follows: 79.9 g TiCl$_4$ and 105 g ZrOCl$_2$.4H$_2$O are dissolved in deionized water and diluted with deionized water to 4 liter volume. Two liters of this solution are combined with 4 liters of deionized water and the resulting solution is heated to 65° C. While maintaining a temperature in the range of 55°-70° C., enough NH$_4$OH is added to the resulting solution to increase the pH to about 8.9. Every ½ hour for a total of nine cycles, HCl and then NH$_4$OH are alternatively added to change the pH to the following ranges: 8.0-8.9 for NH$_4$OH and 1.0-1.6 for HCl. Thus, each cycle lasts for one hour with one cycle comprising the addition of HCl and then NH$_4$OH.

The solution was then filtered, the filtrate cake washed and then calcined in dry air at 350° C. for 3 hours.

The physical properties of the TiO$_2$—ZrO$_2$ sample prepared by the procedure of Example 2 are displayed in TABLE 1.

(b) Preparation of NiO—P—MoO$_3$/TiO$_2$—ZrO$_2$ Catalyst 72.5 g of TiO$_2$—ZrO$_2$ was impregnated twice by pore volume saturations using 58 cc of a Ni—P—Mo solution each time. The Ni—P—Mo solution was prepared by dissolving 29.1 g MoO$_3$, 7.7 g NiCO$_3$ and 10.3 g H$_3$PO$_4$ in deionized water to yield 200 cc of solution. After each impregnation, the material was dried at 120° C. After the second impregnation and drying steps, the material was calcined at 350° C. for 1 hour.

(c) Hydrodenitrogenation with NiO—P—MoO$_3$/TiO$_2$—ZrO$_2$ Catalyst

A vaccum gas oil was passed over the NiO—P—MoO$_3$/TiO$_2$—ZrO$_2$ catalyst under the conditions described in Table 2, Column 1. A total of 80 cc of catalyst was used. Prior to testing, the catalyst was presulfided at 370° C. for 2 hours in 10 percent by volume H$_2$S in H$_2$.

The results are presented in Table 3. Hydrodenitrogenation activity test results are reported as relative weight activity (RWA) and relative volume activity (RVA) with American Cyanamid's commercial HDN-30 catalyst (5 wt % NiO-21 wt % MoO$_3$/Al$_2$O$_3$ assigned RWA and RVA values of 100.

This catalyst according to the invention has an even higher activity than the excellent catalyst of Example 1.

EXAMPLE 3

(a) Preparation of TiO$_2$—ZrO$_2$

A solution of TiCl$_4$ and ZrOCl$_2$.4H$_2$O is coprecipitated with NH$_4$OH at 55°-70° C. by pH swing methodology as follows: 79.9 g TiCl$_4$ and 105 g ZrOCl$_2$.4H$_2$O are dissolved in deionized water and diluted with deionized water to 4 liter volume. Two liters of this solution are combined with 4 liters of deionized water and the resulting solution is heated to 65° C. While maintaining a temperature in the range of 55°-70° C., enough NH$_4$OH is added to the resulting solution to increase the pH to about 8.9. Every ½ hour for a total of nine cycles, HCL and then NH$_4$OH are alternatively added to change the pH to the following ranges: 8.0-8.9 for NH$_4$OH and 1.0-1.6 for HCl. Thus, each cycle lasts for one hour with one cycle comprising the addition of HCl and then HG$_4$OH.

The solution was then filtered, the filter cake washed and then calcined in dry air at 350° C. for 3 hours.

The physical properties of the TiO$_2$—ZrO$_2$ sample prepared by the procedure of Example 3 are displayed in TABLE 1.

(b) Preparation of NiO—P—MoO$_3$/TiO$_2$—ZrO$_2$ Catalyst 72.5 g of TiO$_2$—ZrO$_2$ was impregnated twice by pore volume saturations using 58 cc of a Ni—P—Mo solution each time. The Ni—P—Mo solution was prepared by dissolving 29.1 g MoO$_3$, 7.7 g NiCO$_3$ and 10.3 g H$_3$PO$_4$ in deionized water to yield 200 cc of solution. After each impregnation, the material was dried at 120° C.

After the second impregnation and drying steps, the material was calcined at 350° C. for 1 hour.

(c) Hydrodenitrogenation with NiO—P—MoO$_3$/TiO$_2$—ZrO$_2$ Catalyst

A gas oil was passed over the NiO—P—MoO$_3$/TiO$_2$—ZrO$_2$ catalyst under the conditions described in Table 2, Column 2. A total of 70 g of catalyst was used. Prior to testing, the catalyst was presulfided at 370° C. for 2 hours in 10 percent by volume H$_2$S in H$_2$.

The test results are presented in Table 3. Hydrodenitrogenation activity test results are reported as relative weight activity (RWA) and relative volume activity (RVA) with American Cyanamid's commercial HCH catalyst (2 wt % NiO-2 wt % P-18 wt % MoO$_3$/Al$_2$O$_3$ assigned RWA and RVA values of 100.

This catalyst according to the present invention has somewhat better activity with this substrate than the catalyst of the prior art (Comparative Example 1A) or that made using a support with characteristics excluded by the present invention, i.e., low pore density (Comparative Example 1B).

TABLE 2

| CATALYST ACTIVITY TEST CONDITIONS | | |
|---|---|---|
| | PNA-14 | HDN-6 |
| Test | | |
| Feed Stock Type | vacuum gas oil | gas oil |
| Nitrogen Content, ppm | 420 | 1165 |
| Run Length, days | 3 | 3 |
| Test Conditions | | |
| Pressure, psi | 1250 | 1400 |
| Temperature, °C. | 370 | 385 |
| H$_2$ Flow, SCF/BBL | 2000 | 6000 |
| WHSV, hr$^{-1}$ | 2.0 | — |
| | — | 2.5 |

TABLE 3

| | Activity Test Results for TiO$_2$—ZrO$_2$ Supported Catalysts | | | | |
|---|---|---|---|---|---|
| Example | 1 | 1A | 1B | 2 | 3 |
| Catalyst # | 15129-191 | 15132-114 | 15129-195 | 14868-41 | 14868-41 |
| Support # | 15129-178B | 15132-112 | 15132-074 | 14861-61 | 14861-61 |
| Catalyst Comp. wt % | 16MoO$_3$—3CoO | 16MoO$_3$—3CoO | 16MoO$_3$—3CoO | 18MoO$_3$—3NiO—2P | 18MoO$_3$—3NiO—2P |
| Support Prep Variables | | | | | |
| Salt | Cl—Cl | → | → | → | → |
| Precip. Agent | NH$_4$OH | → | → | → | → |
| Technique | C$^c$ | I$^a$ | I | SW$^b$ | SW |
| Calcination Conditions | | | | | |
| Atmosphere | Dry Air | → | → | → | → |
| Temp., °C. | 350 | 540 | 350 | 350 | 350 |
| Times, hrs. | 2 | 2 | 3 | 3 | 3 |
| Activity Date (HDN*) | | | | | |
| Test | PNA 14 | HDN 6 | HDN 6 | PNA 14 | HDN 6 |
| RVA**/RWA*** | | | | | |
| initial, @ t = 6 hr | 144/144 | 54/29 | 114/64 | 167/116 | — |
| final, @ t = 60 hr | 120/120 | 46/25 | 88/49 | 141/98 | 97/71 |

*Hydrodenitrogenation
**Relative Volume Activity
***Relative Weight Activity
$^a$Increasing pH technique
$^b$Swing pH technique
$^c$Continuous pH technique The above mentioned patents are incorporated herein by reference.

The foregoing results demonstrate that by following the teachings of the present invention, highly advantageous catalyst supports and catalysts can be produced having higher porosities and greater surface areas than can be achieved following the prior art.

We claim:

1. A binary oxidic catalyst support material having high porosity and a specific surface area by nitrogen BET of greater than 250 m$^2$/g prepared by a process comprising the steps of:

TABLE 1

| | Physical Properties of TiO$_2$—ZrO$_2$ Samples | | | |
|---|---|---|---|---|
| Example | 1 | 1A | 1B | 2 & 3 |
| Sample # | 15129-178B | 15132-112 | 15132-074 | 14861-61 |
| Surface Area, m$^2$/gm | | | | |
| N$_2$BET | 316 | 120 | 282 | 312 |
| HgPSD | 258 | 118 | 139 | 281 |
| Pore Volume, cc/g | 0.62 | 0.25 | 0.18 | 0.44 |
| Pore Size Distribution, vol % | | | | |
| 45 angstroms | 4.0 | 0.4 | 72.2 | 2.0 |
| 45-81 angstroms | 40.1 | 52.9 | 10.1 | 92.0 |
| 81 angstroms | 55.9 | 46.7 | 17.7 | 6.0 |
| Pore Diameter at Half Volume, Angstroms | 70 | 80 | 42 | 61 |
| Average Pore Diameter, Angstroms (4V/A) | 92 | 86 | 50 | 63 |

(i) providing a seed hydrosol of at least two members, one member selected from the group consisting of oxides, halides and oxyhalides of titanium and one member selected from the group consisting of oxides, halides and oxyhalides of zirconium;

(ii) mixing a first pH controlling agent with said hydrosol to adjust the pH of said hydrosol to a first region and maintaining said hydrosol at said first pH region, while agitating it, at a temperature and for a period of time sufficient to dissolve fine hydrosol particles;

(iii) then mixing a second pH controlling agent with said hydrosol to adjust the pH of said hydrosol to a second region and maintaining said hydrosol at said second pH region, while agitating it, at a temperature and for a period of time sufficient to cause deposition of the dissolved hydrosol on the undissolved hydrosol and repeating (ii) and (iii) more than once so that said seed hydrosol is caused to grow to an aggregate hydrogel; and, thereafter, (iv) calcining the hydrogel at a temperature above 325° C. and below about 450° C. for from about 0.5 to about 24 hours.

2. A catalyst support material as defined in claim 1 wherein steps (ii) and (iii) are repeated nine times, employing $NH_4OH$ as the first pH controlling agent and HCl as the second pH controlling agent.

3. A catalyst support material as defined in claim 1 wherein the pore mode radius is above about 40 angstroms, and the total intrusion volume is above about 0.4 cc/g.

4. A binary oxidic catalyst support material having high porosity and a specific surface area by nitrogen BET of greater than 250 $m^2/g$, prepared by the process comprising the steps of:

(i) providing a seed hydrosol of at least two members, one member selected from the group consisting of halides, oxyhalides and oxides of titanium and one member selected from the group consisting of halides, oxyhalides and oxides of zirconium;

(ii) adding a pH controlling agent continuously to said hydrosol to maintain the pH of said hydrosol within the range of from about 8 to about 10;

(iii) maintaining said hydrosol at said pH range, while agitating it, at a temperature and for a period of time sufficient to cause growth to an aggregate hydrogel; and, thereafter, (iv) calcining the hydrogel at a temperature above about 325° C. and below about 450° C. for from about 0.5 to about 24 hours.

5. A catalyst support as defined in claim 4 wherein $NH_4OH$ is employed as the pH maintaining agent.

6. A catalyst support material as defined in claim 4 wherein the pore mode radius is above about 40 Angstroms, and the total intrusion volume is above about 0.4 cc/g.

* * * * *